US008514863B2

(12) United States Patent
Yi et al.

(10) Patent No.: US 8,514,863 B2
(45) Date of Patent: *Aug. 20, 2013

(54) DATA TRANSMISSION METHOD FOR HSDPA

(75) Inventors: Seung-June Yi, Seoul (KR);
Woon-Young Yeo, Gyunggi-Do (KR);
So-Young Lee, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 203 days.

This patent is subject to a terminal disclaimer.

(21) Appl. No.: 13/040,190

(22) Filed: Mar. 3, 2011

(65) Prior Publication Data

US 2011/0149870 A1  Jun. 23, 2011

Related U.S. Application Data

(63) Continuation of application No. 12/568,570, filed on Sep. 28, 2009, now Pat. No. 7,924,879, which is a continuation of application No. 12/146,351, filed on Jun. 25, 2008, now Pat. No. 8,238,342, which is a continuation of application No. 10/334,704, filed on Jan. 2, 2003, now Pat. No. 7,403,541.

(30) Foreign Application Priority Data

Jan. 5, 2002 (KR) .................................. 2002-00630

(51) Int. Cl.
*H04L 12/28* (2006.01)
(52) U.S. Cl.
USPC .......................................... 370/394; 370/412
(58) Field of Classification Search
USPC .................. 370/394, 412, 469, 474
See application file for complete search history.

(56) References Cited

U.S. PATENT DOCUMENTS

| 6,614,810 | B1 | 9/2003 | Lee et al. |
|---|---|---|---|
| 6,768,903 | B2 | 7/2004 | Fauconnier et al. |
| 6,909,887 | B2 | 6/2005 | Fauconnier et al. |
| 6,958,589 | B2 | 10/2005 | Kawaji et al. |
| 6,959,020 | B1 | 10/2005 | Hourunranta et al. |
| 7,283,508 | B2 | 10/2007 | Choi et al. |
| 7,415,046 | B2 | 8/2008 | Beckmann et al. |
| 7,433,334 | B2 | 10/2008 | Marjelund et al. |
| 7,484,000 | B2 | 1/2009 | Jiang |
| 2002/0021698 | A1 | 2/2002 | Lee et al. |
| 2002/0025820 | A1 | 2/2002 | Fauconnier et al. |
| 2002/0126629 | A1 | 9/2002 | Jiang et al. |
| 2002/0136181 | A1 | 9/2002 | Belaiche et al. |
| 2003/0147371 | A1 | 8/2003 | Choi et al. |
| 2004/0228313 | A1 | 11/2004 | Cheng et al. |
| 2005/0047525 | A1 | 3/2005 | Lee |
| 2005/0073987 | A1 | 4/2005 | Wu |
| 2006/0165045 | A1 | 7/2006 | Kim et al. |
| 2008/0181166 | A1 | 7/2008 | Lee et al. |
| 2009/0257377 | A1 | 10/2009 | Vedantham et al. |
| 2009/0310537 | A1 | 12/2009 | Bucknell et al. |

OTHER PUBLICATIONS

In the USPTO U.S. Appl. No. 13/560,832, Non-Final Office Action dated Oct. 3, 2012, 7 pages.

*Primary Examiner* — Andrew Lee
(74) *Attorney, Agent, or Firm* — Lee, Hong, Degerman, Kang & Waimey

(57) ABSTRACT

In the data transmission method of an HSDPA system according to the present invention, a transmitter transmits Data Blocks each composed of one or more data units originated from a same logical channel, and a receiver receives the Data Block through a HS-DSCH and distributes the Data Block to a predetermined reordering buffer. Since each Data Block is composed of the MAC-d PDUs originated from the same logical channel, it is possible to monitor the in-sequence delivery of the data units, resulting in reduction of undesirable queuing delay caused by logical channel multiplexing.

8 Claims, 12 Drawing Sheets

DATA TRANSMISSION METHOD FOR HSDPA

This application is a continuation of prior application Ser. No. 12/568,570 filed on Sep. 28, 2009, now U.S. Pat. No. 7,924,879, issued on Apr. 12, 2011, which is a continuation of prior application Ser. No. 12/146,351 filed on Jun. 25, 2008, now U.S. Pat. No. 8,238,342, issued on Aug. 7, 2012, which is a continuation of application Ser. No. 10/334,704 filed on Jan. 2, 2003 now U.S. Pat. No. 7,403,541, issued on Jul. 22, 2008, which claims the benefit of earlier filing date and right of priority to Korean Application No. 00630/2002 filed on Jan. 5, 2002, the contents of all of which are hereby incorporated by reference herein in their entireties.

BACKGROUND OF THE INVENTION

1. Field of the Invention

The present invention relates to a wireless communication system and, more particularly, to a method for reducing the transmission delay of packet data in a mobile radio communication system.

2. Description of the Background Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology. In December, 1998, the ETSI of Europe, the ARIB/TTC of Japan, the T1 of the United States, and the TTA of Korea formed a Third Generation Partnership Project (3GPP) for the purpose of creating the specification for standardizing the UMTS.

The work towards standardizing the UMTS performed by the 3GPP has resulted in the formation of five technical specification groups (TSG), each of which is directed to forming network elements having independent operations. More specifically, each TSG develops, approves, and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

The TSG-RAN group includes a plenary group and four working groups. Working group 1 (WG1) develops a specification for a physical layer (a first layer). Working group 2 (WG2) specifies the functions of a data link layer (a second layer) and a network layer (a third layer). Working group 3 (WG3) defines a specification for an interface among a base station in the UTRAN, a radio network controller (RNC), and a core network. Finally, Working group 4 (WG4) discusses requirements desired for evaluation of radio link performance and items desired for radio resource management.

FIG. 1 shows a structure of a 3GPP UTRAN. This UTRAN 110 includes one or more radio network sub-systems (RNS) 120 and 130. Each RNS 120 and 130 includes a RNC 121 and 131 and one or more Nodes B 122 and 123 and 132 and 133 (e.g., a base station) managed by the RNCs. RNCs 121 and 131 are connected to a mobile switching center (MSC) 141 which performs circuit switched communications with the GSM network. The RNCs are also connected to a serving general packet radio service support node (SGSN) 142 which performs packet switched communications with a general packet radio service (GPRS) network.

Nodes B are managed by the RNCs, receive information sent by the physical layer of a terminal 150 (e.g., mobile station, user equipment and/or subscriber unit) through an uplink, and transmit data to a terminal 150 through a downlink. Nodes B, thus, operate as access points of the UTRAN for terminal 150.

The RNCs perform functions which include assigning and managing radio resources. An RNC that directly manages a Node B is referred to as a control RNC (CRNC). The CRNC manages common radio resources. A serving RNC (SRNC), on the other hand, manages dedicated radio resources assigned to the respective terminals. The CRNC can be the same as the SRNC. However, when the terminal deviates from the region of the SRNC and moves to the region of another RNC, the CRNC can be different from the SRNC. Because the physical positions of various elements in the UMTS network can vary, an interface for connecting the elements is necessary. Nodes B and the RNCs are connected to each other by an Iub interface. Two RNCs are connected to each other by an Iur interface. An interface between the RNC and a core network is referred to as Iu.

FIG. 2 shows a structure of a radio access interface protocol between a terminal which operates based on a 3GPP RAN specification and a UTRAN. The radio access interface protocol is horizontally formed of a physical layer (PHY), a data link layer, and a network layer and is vertically divided into a control plane for transmitting a control information and a user plane for transmitting data information. The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (L1), a second layer (L2), and a third layer (L3) based on three lower layers of an open system interconnection (OSI) standard model well known in a communication system.

The first layer (L1) operates as a physical layer (PHY) for a radio interface and is connected to an upper medium access control (MAC) layer through one or more transport channels. The physical layer transmits data delivered to the physical layer (PHY) through a transport channel to a receiver using various coding and modulating methods suitable for radio circumstances. The transport channel between the physical layer (PHY) and the MAC layer is divided into a dedicated transport channel and a common transport channel based on whether it is exclusively used by a single terminal or shared by several terminals.

The second layer L2 operates as a data link layer and lets various terminals share the radio resources of a W-CDMA network. The second layer L2 is divided into the MAC layer, a radio link control (RLC) layer, a packet data convergence protocol (PDCP) layer, and a broadcast/multicast control (BMC) layer.

The MAC layer delivers data through an appropriate mapping relationship between a logical channel and a transport channel. The logical channels connect an upper layer to the MAC layer. Various logical channels are provided according to the kind of transmitted information. In general, when information of the control plane is transmitted, a control channel is used. When information of the user plane is transmitted, a traffic channel is used. The MAC layer is divided two sub-layers according to performed functions. The two sub-layers are a MAC-d sub-layer that is positioned in the SRNC and manages the dedicated transport channel and a MAC-c/sh sub-layer that is positioned in the CRNC and manages the common transport channel.

The RLC layer forms an appropriate RLC protocol data unit (PDU) suitable for transmission by the segmentation and concatenation functions of an RLC service data unit (SDU) received from an upper layer. The RLC layer also performs an automatic repeat request (ARQ) function by which an RLC PDU lost during transmission is re-transmitted. The RLC layer operates in three modes, a transparent mode (TM), an unacknowledged mode (UM), and an acknowledged mode (AM). The mode selected depends upon the method used to process the RLC SDU received from the upper layer. An RLC buffer stores the RLC SDUs or the RLC PDUs received from the upper layer exists in the RLC layer.

The packet data convergence protocol (PDCP) layer is an upper layer of the RLC layer which allows data items to be transmitted through a network protocol such as the IPv4 or the IPv6. A header compression technique for compressing and transmitting the header information in a packet can be used for effective transmission of the IP packet.

The broadcast/multicast control (BMC) layer allows a message to be transmitted from a cell broadcast center (CBC) through the radio interface. The main function of the BMC layer is scheduling and transmitting a cell broadcast message to a terminal. In general, data is transmitted through the RLC layer operating in the unacknowledged mode.

The PDCP layer and the BMC layer are connected to the SGSN because a packet switching method is used, and are located only in the user plane because they transmit only user data. Unlike the PDCP layer and the BMC layer, the RLC layer can be included in the user plane and the control plane according to a layer connected to the upper layer. When the RLC layer belongs to the control plane, data is received from a radio resource control (RRC) layer. In the other cases, the RLC layer belongs to the user plane. In general, the transmission service of user data provided from the user plane to the upper layer by the second layer (L2) is referred to as a radio bearer (RB). The transmission service of control information provided from the control plane to the upper layer by the second layer (L2) is referred to as a signaling radio bearer (SRB). As shown in FIG. 2, a plurality of entities can exist in the RLC and PDCP layers. This is because a terminal has a plurality of RBs, and one or two RLC entities and only one PDCP entity are generally used for one RB. The entities of the RLC layer and the PDCP layer can perform an independent function in each layer.

The RRC layer positioned in the lowest portion of the third layer (L3) is defined only in the control plane and controls the logical channels, the transport channels, and the physical channels in relation to the setup, the reconfiguration, and the release of the RBs. At this time, setting up the RB means processes of stipulating the characteristics of a protocol layer and a channel, which are required for providing a specific service, and setting the respective detailed parameters and operation methods. It is possible to transmit control messages received from the upper layer through a RRC message.

The aforementioned W-CDMA system attempts to achieve a transmission speed of 2 Mbps indoors and in a pico-cell circumstance, and a transmission speed of 384 kbps in a general radio condition. However, as the wireless Internet becomes more widespread and the number of subscribers increases, more diverse services will be provided. In order to support these services, it is expected that higher transmission speeds will be necessary. In the current 3GPP consortium, research is being performed to provide high transmission speeds by developing the W-CDMA network. One representative system is known as the high-speed downlink packet access (HSDPA) system.

The HSDPA system is based on WCDMA. It supports a maximum speed of 10 Mbps to the downlink and is expected to provide shorter delay time and an improved capacity than existing systems. The following technologies have been applied to the HSDPA system in order to provide higher transmission speed and enlarged capacity: link adaptation (LA), hybrid automatic repeat request (HARQ), fast cell selection (FCS), and multiple input, multiple output (MIMO) antenna.

The LA uses a modulation and coding scheme (MCS) suitable for the condition of a channel. When the channel condition is good, high degree modulation such as 16QAM or 64QAM is used. When the channel condition is bad, low degree modulation such as QPSK is used.

In general, low degree modulation methods support a lesser amount of transmission traffic than high degree modulation methods. However, in low degree modulation methods, a transmission success ratio is high when a channel condition is not desirable and therefore, it is advantageous to use this form of modulation when the influences of fading or interference is large. On the other hand, frequency efficiency is better in high degree modulation methods than in low degree modulation methods. In the high degree modulation methods, it is possible, for example, to achieve a transmission speed of 10 Mbps using the 5 MHz bandwidth of W-CDMA. However, high degree modulation methods are very sensitive to noise and interference. Therefore, when a user terminal is located close to a Node B, it is possible to improve transmission efficiency using 16QAM or 64QAM. And, when the terminal is located on the boundary of the cell or when the influence of fading is large, low modulation method such as QPSK is useful.

The HARQ method is a re-transmission method which differs from existing re-transmission methods used in the RLC layer. The HARQ method is used in connection with the physical layer, and a higher decoding success ratio is guaranteed by combining re-transmitted data with previously received data. That is, a packet that is not successfully transmitted is not discarded but stored. The stored packet is combined with a re-transmitted packet in a step before decoding and is decoded. Therefore, when the HARQ method is used together with the LA, it is possible to significantly increase the transmission efficiency of the packet.

The FCS method is similar to a related art soft handover. That is, the terminal can receive data from various cells. However, in consideration of the channel condition of each cell, the terminal receives data from a single cell which has the best channel condition. The related art soft handover methods increase the transmission success ratio using diversity, and more specifically, by receiving data from various cells. However, in the FCS method, data is received from a specific cell in order to reduce interference between cells.

Regarding the MIMO antenna system, the transmission speed of data is increased using various independent radio waves propagated in the dispersive channel condition. The MIMO antenna system usually consists of several transmission antennas and several reception antennas, so that diversity gain is obtained by reducing correlation between radio waves received by each antenna.

The HSDPA system, thus, to adopt a new technology based on a WCDMA network. However, in order to graft new technologies, modification is unavoidable. As a representative example, the function of Node B is improved. That is, though most control functions are located in the RNC in a WCDMA network, new technologies for the HSDPA system are managed by the Node B in order to achieve faster adjustment to the channel conditions and to reduce a delay time in the RNC.

The enhanced function of the Node B, however, is not meant to replace the functions of the RNC but rather is intended to supplement these functions for high speed data transmission, from a point of view of the RNC.

Thus, in an HDSPA system, the Nodes B are modified to perform some of the MAC functions unlike in the WCDMA system. A modified layer which performs some of the MAC function is referred to as a MAC-hs sub-layer.

The MAC-hs sub-layer is positioned above the physical layer and can perform packet scheduling and LA functions. The MAC-hs sub-layer also manages a new transport channel known as HS-DSCH (High Speed-Downlink Shared Channel) which is used for HSDPA data transmission. The HS-DSCH channel is used when data is exchanged between the MAC-hs sub-layer and the physical layer.

FIG. 3 shows a radio interface protocol structure for supporting the HSDPA system. As shown, the MAC layer is divided into a MAC-d sub-layer, a MAC-c/sh sub-layer, and a MAC-hs sub-layer. The MAC-hs sub-layer is positioned above the physical layer (PHY) of a Node B. The MAC-c/sh and MAC-d sub-layers are located in the CRNC and the SRNC. A new transmission protocol referred to the HS-DSCH frame protocol (FP) is used between the RNC and the Node B or among the RNCs for the delivery of HSDPA data.

The MAC-c/sh sub-layer, the MAC-d sub-layer, and the RLC layer positioned above the MAC-hs sub-layer perform the same functions as the current system. Therefore, a slight modification of the current RNC can fully support the HSDPA system.

FIG. 4 shows the structure of a MAC layer used in the HSDPA system. The MAC layer is divided into a MAC-d sub-layer 161, a MAC-c/sh sub-layer 162, and a MAC-hs sub-layer 163. The MAC-d sub layer in the SRNC manages dedicated transport channels for a specific terminal. The MAC-c/sh sub-layer in the CRNC manages the common transport channels. The MAC-hs sub-layer in the Node B manages the HS-DSCH. In this arrangement, the functions performed by the MAC-c/sh sub-layer 162 in the HSDPA system are reduced. That is, the MAC-c/sh sub-layer assigns common resources shared by various terminals in the conventional system and processes the common resources. However, in the HSDPA system, the MAC-c/sh sub-layer simply performs a flow control function of the data delivery between the MAC-d sub-layer 161 and the MAC-hs sub-layer 163.

Referring to FIG. 4, it will be described how data received from the RLC layer is processed and delivered to the HS-DSCH in the MAC layer. First, the path of the RLC PDU delivered from the RLC layer through the dedicated logical channel, (i.e. a dedicated traffic channel (DTCH) or a dedicated control channel (DCCH)), is determined by a channel switching function in the MAC-d layer. When an RLC PDU is delivered to the dedicated channel (DCH), a related header is attached to the RLC PDU in the MAC-d sub-layer 161 and the RLC PDU is delivered to the physical layer through the DCH. When the HS-DSCH channel of the HSDPA system is used, the RLC PDU is delivered to the MAC-c/s h sub-layer 162 by a channel switching function. When a plurality of logical channels use one transport channel, the RLC PDU passes through a transport channel multiplexing block. The identification information (control/traffic (C/T) field) of the logical channel, to which each RLC PDU belongs, is added during this process. Also, each logical channel has a priority. Data of a logical channel has the same priority.

The MAC-d sub-layer 161 transmits the priority of a MAC-d PDU when the MAC-d PDU is transmitted. The MAC-c/sh sub-layer 162 that received the MAC-d PDU simply passes the data received from the MAC-d sub-layer 161 to the MAC-hs sub-layer 163. The MAC-d PDU delivered to the MAC-hs sub-layer 163 is stored in the transmission buffer in the scheduling block. One transmission buffer exists per each priority level. Each MAC-hs SDU (MAC-d PDU) is sequentially stored in the transmission buffer corresponding to its priority.

An appropriate data block size is selected by the scheduling function depending on the channel condition. Accordingly, a data block is formed by one or more MAC-hs SDUs.

A priority class identifier and a transmission sequence number are added to each data block and each data block is delivered to the HARQ block.

A maximum 8 HARQ processes exist in the HARQ block. The data block received from the scheduling block is delivered to an appropriate HARQ process. Each HARQ process operates in a stop and wait (SAW) ARQ. In this method, the next data block is not transmitted until a current data block is successfully transmitted. As mentioned above, because only one data block is transmitted in a TTI, only one HARQ process is activated in one TTI.

Another HARQ processes waits until its turn. Each HARQ process has a HARQ process identifier. A corresponding HARQ process identifier is previously known to the terminal through a downlink control signal, so that a specific data block passes through the same HARQ process in the transmitter (the UTRAN) and the receiver (the terminal). The HARQ process that transmitted the data block also stores the data block to provision the future re-transmission. The HARQ process, re-transmits the data block when NonAC-Knowledge (NACK) is received from the terminal.

When ACK is received from the terminal, the HARQ process deletes the corresponding data block and prepares the transmission of a new data block. When the data block is transmitted, a transport format and resource combination (TFRC) block selects an appropriate TFC for the HS-DSCH.

FIG. 5 shows a structure of the MAC layer of the terminal used in the HSDPA system. This MAC layer is divided into a MAC-d sub-layer 173, a MAC-c/sh sub-layer 172, and a MAC-hs sub-layer 171. Unlike the UTRAN, the above three layers are located in the same place. The MAC-d sub-layer and the MAC-c/sh sub-layer in the terminal are almost same as those in the UTRAN, but the MAC-hs sub-layer 171 is slightly different because the MAC-hs sub-layer in the UTRAN performs only transmission and the MAC-hs sub-layer in the terminal performs only reception.

The manner in which the MAC layer receives the data from the physical layer and delivers it to the RLC layer will now be described. The data block delivered to the MAC-hs sub-Payer 171 through the HS-DSCH is first stored in one of the HARQ processes in the HARQ block. In which process the data block is stored can be known from the HARQ process identifier included in the downlink control signal.

The HARQ process, in which the data block is stored, transmits the NACK information to the UTRAN when there are errors in the data block and requests the re-transmission of the data block. When no errors exist, the HARQ process delivers the data block to a reordering buffer and transmits the ACK information to the UTRAN. A reordering buffer has a priority like the transmission buffer in the UTRAN. The HARQ process delivers the data block to the corresponding reordering buffer with the aid of a priority class identifier included in the data block. A significant characteristic of the reordering buffer is that it supports in-sequence delivery of data.

Data blocks are sequentially delivered to an upper layer based on a transmission sequence number (TSN). More specifically, when a data block is received while one or more previous data blocks are missing, the data block is stored in the reordering buffer and is not delivered to the upper layer. Rather, the stored data block is delivered to the upper layer only when all previous data blocks are received and delivered to the upper layer. Because several HARQ processes operate, a reordering buffer usually receives data blocks out of sequence. Therefore, an in-sequence delivery function is used for the reordering buffer so that the data blocks can be delivered to the upper layer sequentially.

One difference between the reordering buffer of the terminal and the transmission buffer of the UTRAN is that the reordering buffer stores data in units of data block which is composed of one or more MAC-hs SDUs, while the transmission buffer stores data in units of MAC-hs SDU (=MAC-d PDU). Because the MAC-d sub-layer 173 processes data in units of MAC-d PDUs, when the reordering buffer of the terminal MAC-hs sub-layer 171 delivers the data block to the MAC-d sub-layer 173, the reordering buffer must first disassemble the data block into the MAC-d PDUs and then deliver them to the MAC-d sub-layer. The MAC-c/sh sub-layer 172 passes the MAC-d PDUs received from the MAC-hs sub-layer 171 to the MAC-d sub-layer. The MAC-d sub-layer 173 that received the MAC-d PDU checks the logical channel identifier (C/T field) included in each MAC-d PDU in the transport channel multiplexing block and delivers the MAC-d PDUs to the RLC through the corresponding logical channel.

FIG. 6 shows processes for transmitting and receiving a data block in an HSDPA system. The MAC-d PDUs are actually stored in a transmission buffer 180. However, for the sake of convenience, it is shown as a data block (=one or more MAC-d PDUs). The sizes of the respective data blocks can vary. However, the sizes are shown to be the same because the data blocks for illustrative purposes. Also, it is assumed that eight HARQ processes 181 through 188 exist.

The process includes transmitting data blocks to the receiver for data blocks having transmission sequence numbers from TSN=13 to TSN=22 in the transmission buffer, A data block with a lower TSN is served first to an empty HARQ process. For example, as shown, the data block TSN=13 is delivered to HARQ process #1 181, and data block TSN=14 is delivered to HARQ process #8. From this explanation, it is clear that the TSN is not related to the HARQ process number.

When the HARQ process receives an arbitrary data block, the HARQ process transmits the data block to the receiver in a specific TTI and stores the data block for re-transmission that might be performed later. Only one data block can be transmitted in a certain TTI. Accordingly, only one HARQ process is activated in a single TTI. The HARQ process that transmitted the data block informs the receiver of its process number through a downlink control signal which is transmitted through a different channel than that of the data block.

The reason why the HARQ process of the transmitter coincides with the HARQ process of the receiver is that a stop-and-wait ARQ method is used by is each HARQ process pair. That is, HARQ process #1 181 that transmitted data block TSN=13 does not transmit another data block until the data block is successfully transmitted. Because a receiver HARQ process #1 191 can know that data is transmitted thereto for a corresponding TTI through the downlink control signal, the receiver HARQ process #1 transmits the NACK information to the transmitter through an uplink control signal when the data block is not successfully received within a defined transmission time interval (TTI). On the other hand, when a data block is successfully received, the receiver HARQ process #1 transmits the ACK information to the transmitter, and at the same time delivers the corresponding data block to the reordering buffer according to the priority.

The reordering buffer exists per priority level. The HARQ process checks the priority included in the header information of the data block and delivers the data block to the reordering buffer according to the priority. The data block delivered to the reordering buffer is then delivered to the upper layer when all of the previous data blocks are delivered to the upper layer. However, when one or more previous data blocks are not delivered to the upper layer, the data block is stored in the reordering buffer 190. That is, the reordering buffer must support in-sequence delivery of data blocks to the upper layer. A data block that is not delivered to the upper layer is stored in the reordering buffer.

To illustrate the foregoing, FIG. 6 shows that when data block TSN=14 is received but data block TSN=13 is not received, data block TSN=14 is stored in the reordering buffer until data block TSN=13 is received. When data block TSN=13 is received, both data blocks are delivered to the upper layer in the order of TSN=13 and TSN=14. When the data blocks are delivered to the upper layer, they are disassembled in units of MAC-d PDUs and are delivered as described above.

FIG. 7 is a data block (MAC-hs PDU) format adopted in the HSDPA system. As shown in FIG. 7, the data block consists of a MAC-hs header including control information and a MAC-hs payload carrying the upper layer PDU.

The MAC-hs header includes a Queue ID field and a TSN field, and the MAC-hs payload includes a plurality of MAC-hs SDUs (MAC-d PDUs). Each MAC-d PDU includes the C/T field and the MAC-d SDU (RLC PDU). The C/T field is included in the MAC-d PDU header if multiplexing on MAC is applied, and it provides identification of the logical channel when multiple logical channels are carried on the same transport channel. Four bits are currently allocated for C/T field in order to identify up to 15 different logical channels (1111 is reserved). Since a radio bearer is usually mapped to one logical channel, the C/T field can be further used for identification of radio bearer.

FIG X is a flowchart illustrating how to deliver the received data blocks to re-ordering buffer in UE side MAC-hs sub-layer.

As shown in FIG X, the UE side MAC-hs establishes the reordering buffer according to the logical channel priority (SX1), and checks if a Data Block is received from HARQ entity (SX2). If the Data Block is received from HARQ entity, the MAC-hs checks the logical channel priority field (SX3) and forwards the Data Block to the reordering buffer of same priority (SX4). Then, the MAC-hs checks the sequence number of the Data Block, i.e. TSN of the Data Block, (SX5), and determines whether the Data Block can be delivered or not (SX6). If the Data Block is determined that it can be delivered, the MAC-hs disassembles the Data Block into data units (SX7), and checks the logical channel identity of each data units by the CIT field (SX8). Each of the disassembled data units is then delivered to the corresponding logical channel, respectively (SX9).

In step SX6, if the Data Block is determined that it can not be delivered due to one or more missing Data Blocks preceding it, the MAC-hs stores the Data Block in the reordering buffer according to its sequence number instead of delivering it (SX10). After the Data Block is processed in the above manner, the UE side MAC-hs determines whether or not the HS-DSCH connection is released (SX11). If the HS-DSCH connection is not released, the algorithm goes to the step SX2.

FIG. 9 is an exemplary view for illustrating how data blocks consisting of MAC-d PDUs from different logical channels are transmitted in the HSDPA system.

In FIG. 9, 4 data blocks are transmitted from the UTRAN side MAC-hs. For example, Data Block #10 is composed of 3 MAC-d PDUs where 1 MAC-d PDU is originated from a logical channel #1 and 2 MAC-d PDUs originated from a logical channel #2. The figure illustrates the case when Data Block #10, #12, and #13 are successfully received by the UE side MAC-hs while Data block #11 is lost during transmission. Since Data Block #10 has been successfully received, the reordering buffer forwards the Data Block #10 to the upper layer immediately. However, since Data Block #11 is not received, the correctly received Data Block #12 and #13 can not be delivered to the upper layer but just stored in the reordering buffer until Data Block #11 is received or until some stall avoidance mechanism is terminated.

From the viewpoint of logical channel #2, the received MAC-d PDUs are seen as consecutive, since there are no missing MAC-d PDUs between the two adjacent MAC-d PDUs. In other words, since the Data Block #11 does not contain any PDUs from logical channel #2, whether Data Block #11 is received or not does not affect the in-sequence delivery of logical channel #2. Accordingly, if the reordering buffer knows the in-sequence delivery of MAC-d PDUs of a specific logical channel, the MAC-d PDUs can be immediately delivered to the upper layer without being delayed in the reordering buffer.

As described above, the multiplexing of logical channels has a drawback in that delivery of MAC-d PDUs of one logical channel may be unnecessarily delayed due to a missing MAC-d PDU of other logical channel. Moreover, the delayed MAC-d PDUs sometimes become useless because of the discards in the RLC layer.

SUMMARY OF THE INVENTION

The present invention has been made in an effort to solve the above problems.

It is an object of the present invention to provide a data transmission method of HSDPA allowing the MAC-d PDU delay in the reordering buffer to be minimized by monitoring the in-sequence delivery of MAC-d PDUs originated from the same logical channel.

It is another object of the present invention to provide a data transmission method of HSDPA capable of enhancing the data transmission by minimizing data processing delay in UTRAN (transmitter) and UE (receiver).

It is still another object of the present invention to provide a data transmission method capable of minimizing transmission delay by quickly delivering the data queued in the reordering buffer to the higher layer.

In one aspect of the present invention, the data transmission method for HSDPA system comprises transmitting, with a transmitter, a Data Block composed of one or more data units originated from a same logical channel; receiving, with a receiver, the Data Block through a HS-DSCH; and distributing the Data Block to a predetermined reordering buffer.

The Data Block includes a transmission sequence number (TSN) field of which value identifies Data Block and the data unit includes a control traffic (C/T) field of which value identifies the logical channel.

The Data Block distribution to the reordering buffer is performed in such a manner of checking the CIT field; distributing the Data Block to the reordering buffer based on the value of the C/T field; checking the TSN field; and delivering the Data Block to higher layers when the Data Block is determined an in-sequence Data Block or storing the Data Block in a reordering buffer when the Data Block is determined as an out-of sequence Data Block, based on the value of the TSN field. The out-of sequence Data Block waits until a missed Data Block is received and then the Data Blocks in the reordering buffer are reordered if the missed Data Block is received.

In another aspect of the present invention, the Data Block has a transmission sequence number (TSN) field of which value identifies Data Block and a control traffic (UT) field of which value identifies the logical channel.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention will be described hereinafter with reference to the accompanying drawings.

In the present invention, one reordering buffer is assigned for each logical channel so as to prevent the received data to be undesirably delayed in the reordering buffer. That is, in the UTRAN side each Data Block is composed of MAC-d PDUs originated from a single logical channel rather than MAC-d PDUs produced by multiplexing different logical channels.

A data transmission method according to a first preferred embodiment of the present invention will be described hereinafter with reference to FIG. 10 and FIG. 11.

Figure 1:
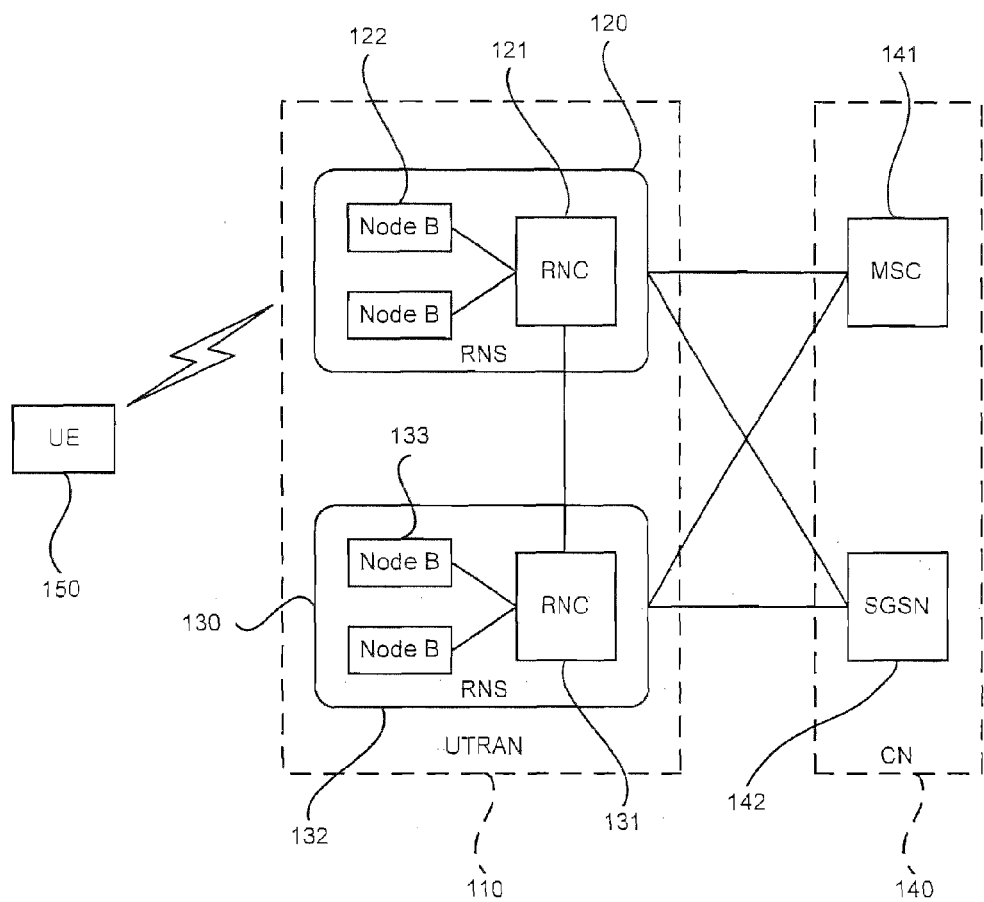
FIG. 1 is a conceptual view showing a structure of a UMTS radio access network (UTRAN) of a 3GPP.
Figure 2:
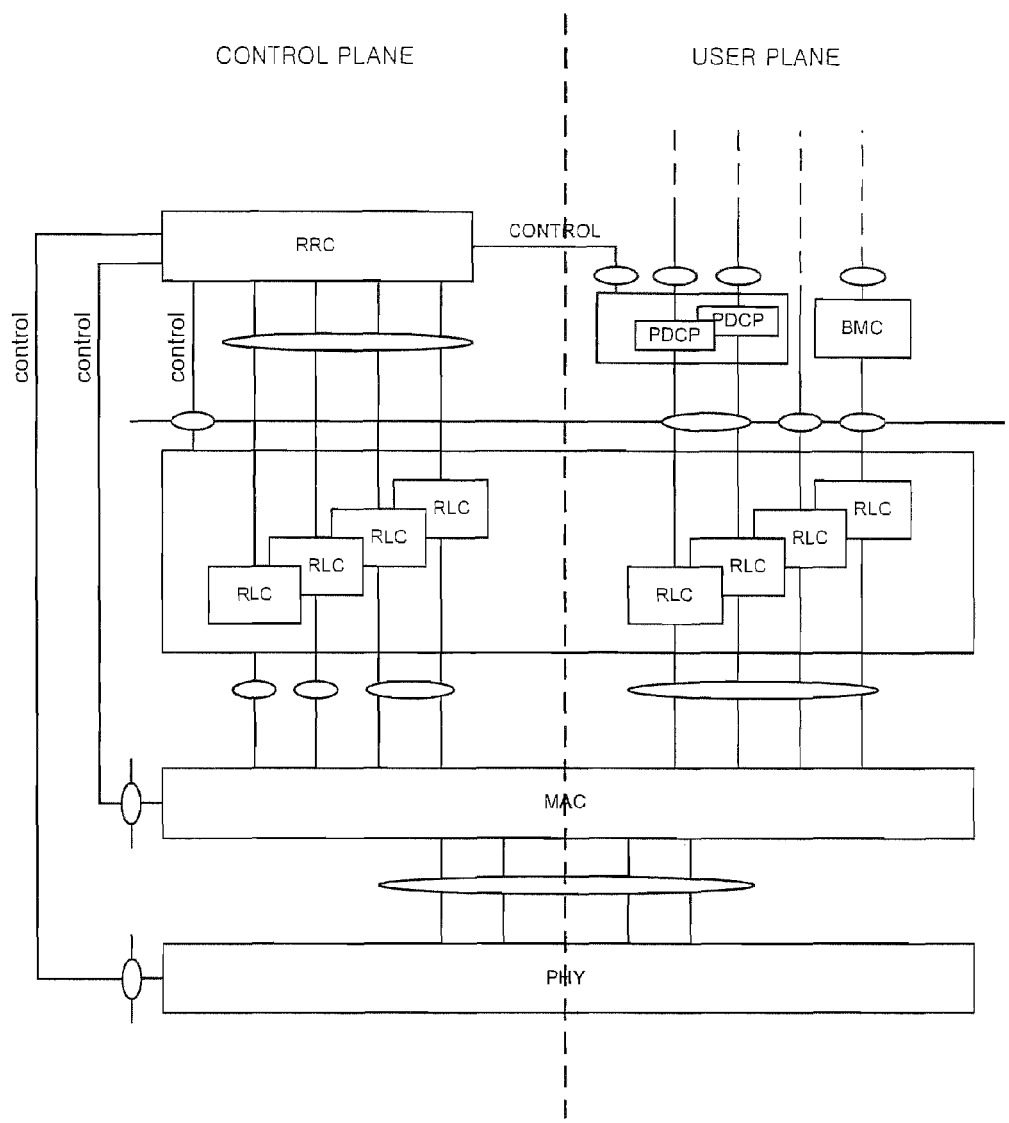
FIG. 2 is a conceptual view for showing a protocol structure of a radio interface.
Figure 3:
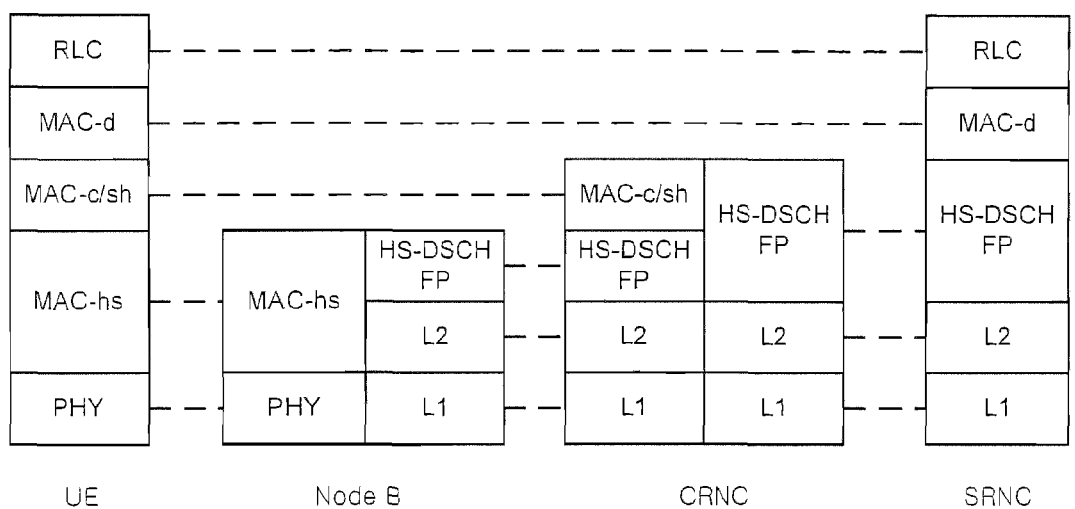
FIG. 3 is a conceptual view showing a structure of a radio interface protocol for a high speed downlink packet access (HSDPA) system.
Figure 4:
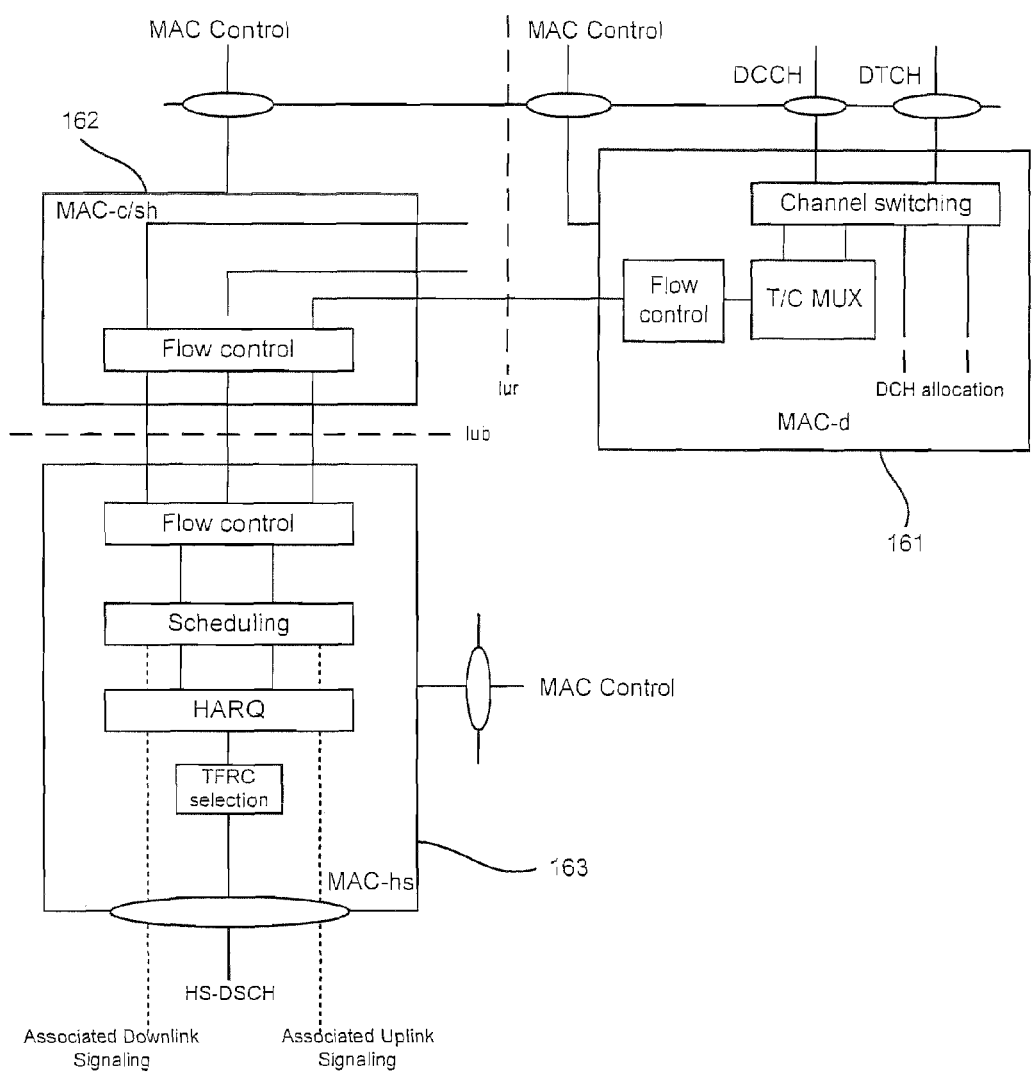
FIG. 4 is a conceptual view showing a UTRAN side MAC architecture supporting the HSDPA system.
Figure 5:
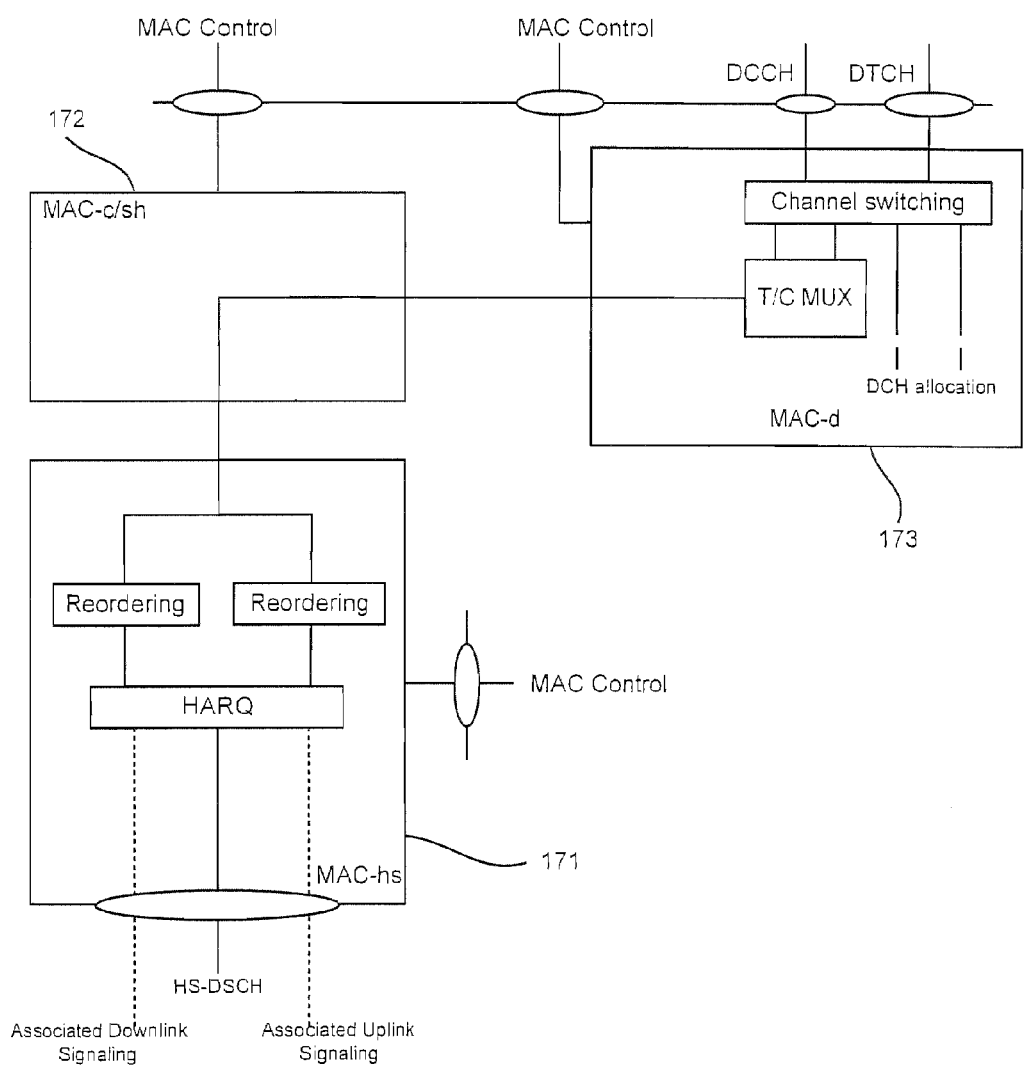
FIG. 5 is a block diagram of a UE side MAC architecture supporting the HSDPA system.
Figure 6:
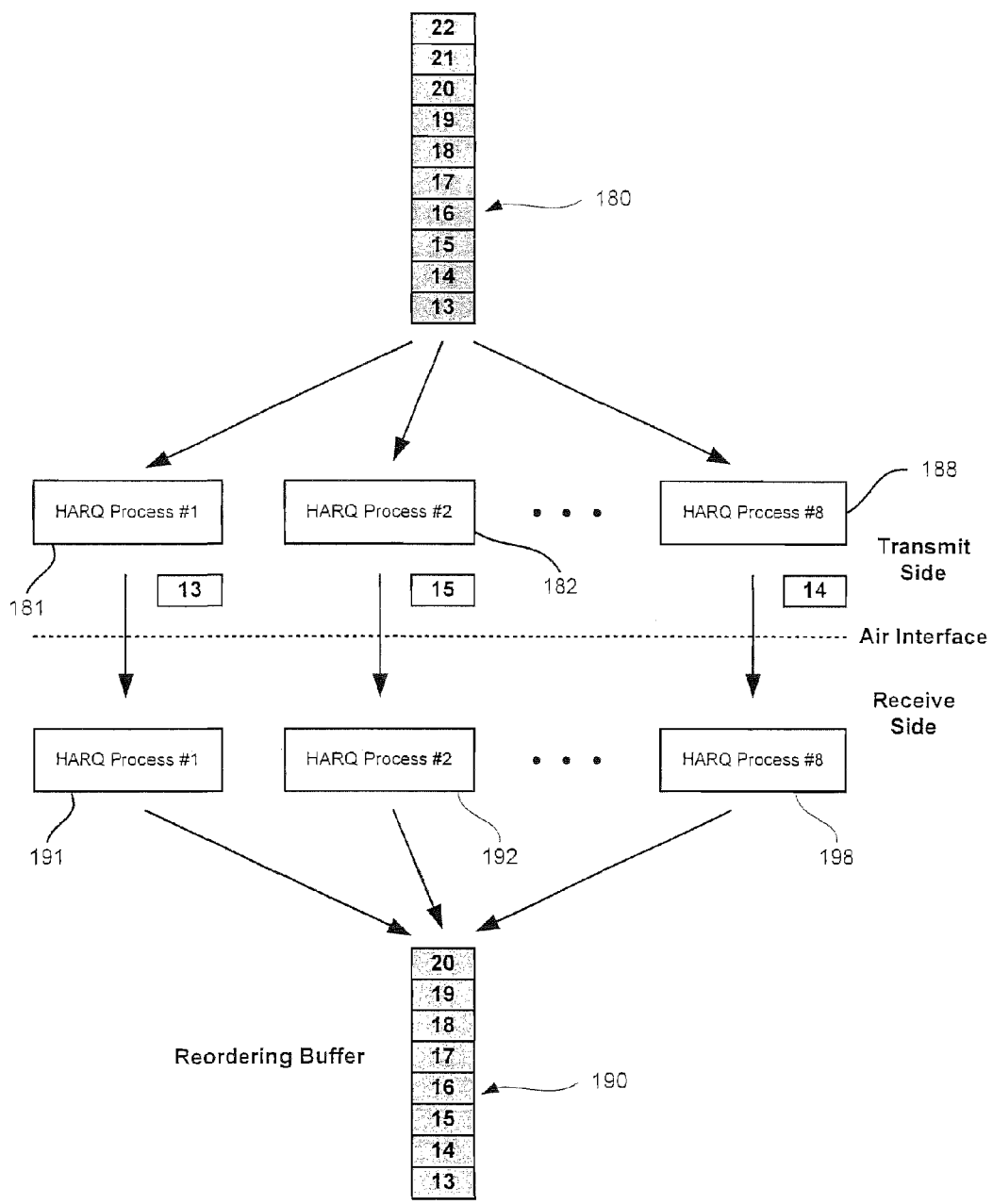
FIG. 6 is a conceptual view illustrating how data blocks are transmitted and processed in UTRAN side MAC-hs and UE side MAC-hs.
Figure 7:
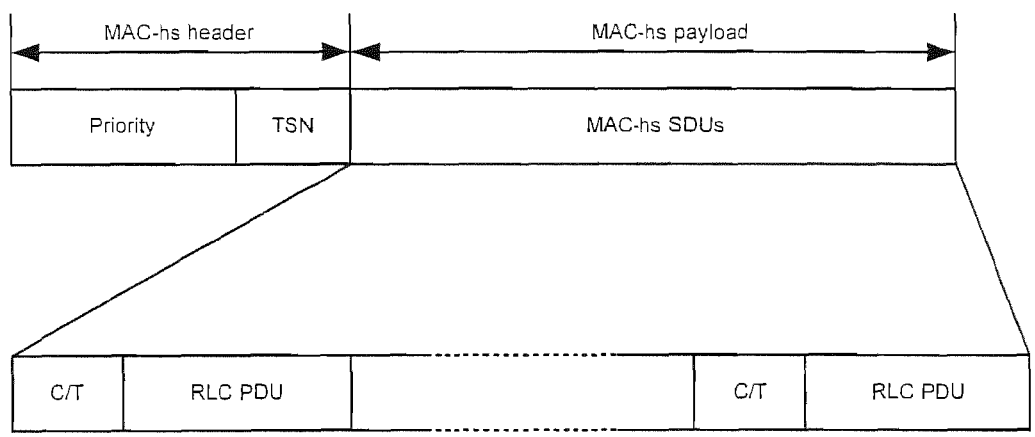
FIG. 7 is a drawing illustrating a conventional MAC-hs PDU format for HS-DSCH.
Figure 8:
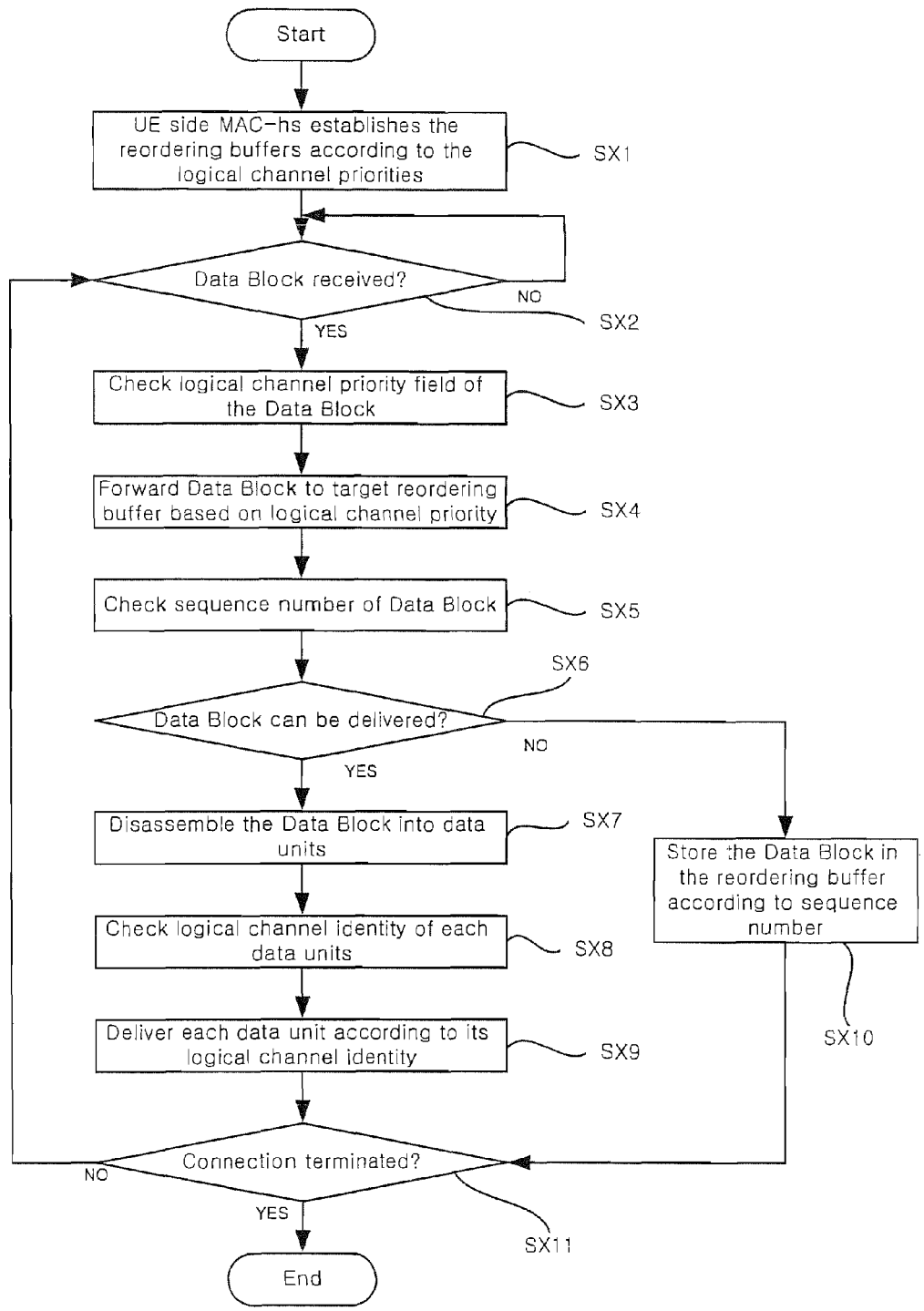
FIG. 8 is a flowchart illustrating a data delivery flow in UE side MAC-hs for HSDPA according to a conventional method.
Figure 9:
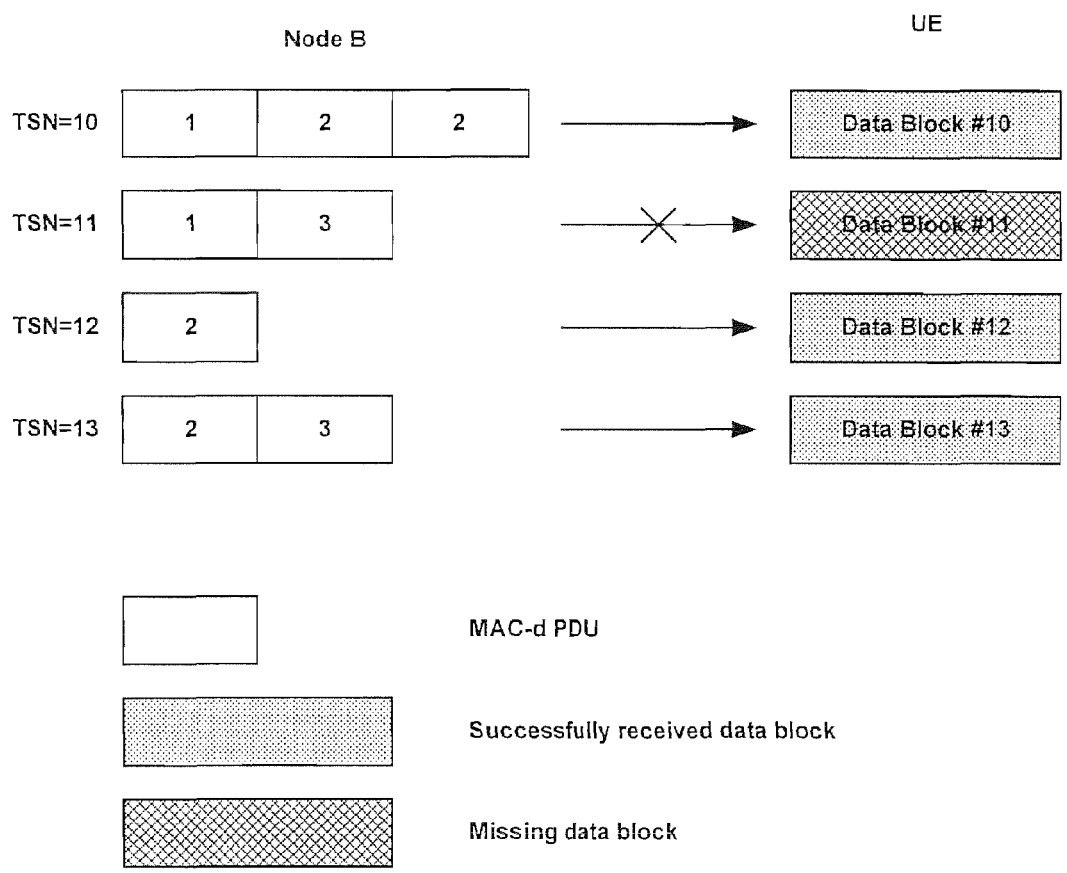
FIG. 9 is an exemplary view illustrating how data blocks multiplexed with different logical channels are transmitted in the current HSDPA system.
Figure 10:
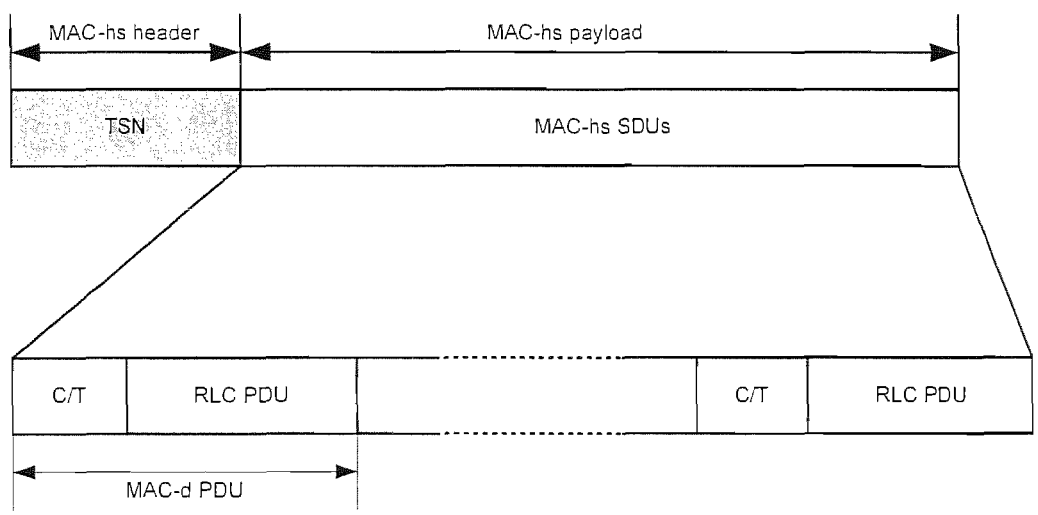
FIG. 10 is a drawing illustrating a Data Block format for HS-DSCH adopted in the data transmission method according to a preferred embodiment of the present invention.

FIG. 10 shows a Data Block format for HS-DSCH adopted in the data transmission method according to the first preferred embodiment of the present invention.

As shown in the FIG. 10, the Data Block consists of a MAC-hs header and a MAC-hs payload. The MAC-hs header includes a TSN field but not a priority field, which exist in the conventional MAC-hs header, for identifying the reordering buffer having a specific priority level. The TSN of the MAC-hs header is unique to each logical channel and is used to guarantee the in-sequence delivery of Data Blocks.

The MAC-hs payload consists of one or more MAC-hs SDUs (MAC-d PDUs) where each MAC-d PDU is composed of a C/T field and an RLC PDU. The C/T field is used for constructing the Data Block with MAC-d PDUs of same logical channel. Accordingly, the C/T fields of all MAC-d PDUs in the same Data Block are identical with each other.

Since the C/T fields of the MAC-d PDUs in each Data Block have the same value, the priority field, which exists in the conventional Data Block, for identifying the reordering buffer of UE side MAC-hs is not required any more. Accordingly, the Data Block format can be simpler than the conventional one.

Figure 11:
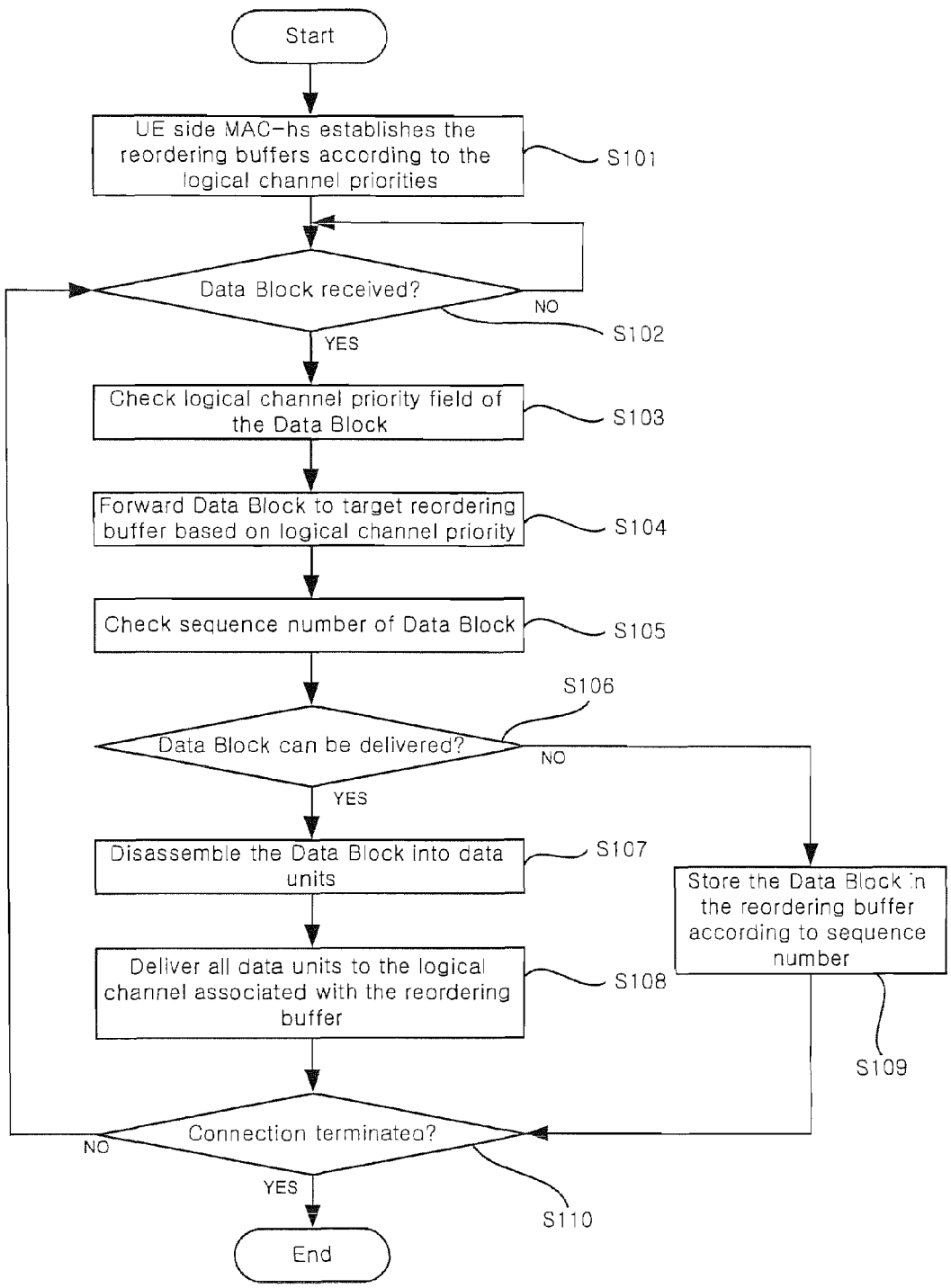
FIG. 11 is a flowchart illustrating a data delivery flow in UE side MAC-hs for HSDPA according to a preferred embodiment of the present invention.

FIG. 11 is a flowchart illustrating a data delivery flow in UE side MAC-hs for HSDPA according to the first preferred embodiment of the present invention.

As shown in FIG. 10, the UE side MAC-hs establishes the reordering buffer according to the logical channel identity (S101), and checks if a Data Block is received from HARQ entity (S102). If the Data Block is received from HARQ entity, the MAC-hs checks the logical channel identity by the C/T field (S103) and forwards the Data Block to the reordering buffer associated with the indicated logical channel (S104). Then, the MAC-hs checks the sequence number of the Data Block, i.e. TSN of the Data Block, (S105), and determines whether the Data Block can be delivered or not (S106). If the Data Block is determined that it can be delivered, the MAC-hs disassembles the Data Block into data units (S107), and delivers all the data units to the logical channel associated with the reordering buffer (S108). In this case, check of logical channel identity for each data unit is not necessary, since all the data units belong to the same logical channel which is closely connected to the reordering buffer.

In step S106, if the Data Block is determined that it can not be delivered to due to one or more missing Data Blocks preceding it, the MAC-hs stores the Data Block in the reordering buffer according to its sequence number instead of delivering it (S109). After the Data Block is processed in the above manner, the UE side MAC-hs determines whether or not the HS-DSCH connection is released (S110). If the HS-DSCH connection is not released, the algorithm goes to the step SX2.

Figure 12:
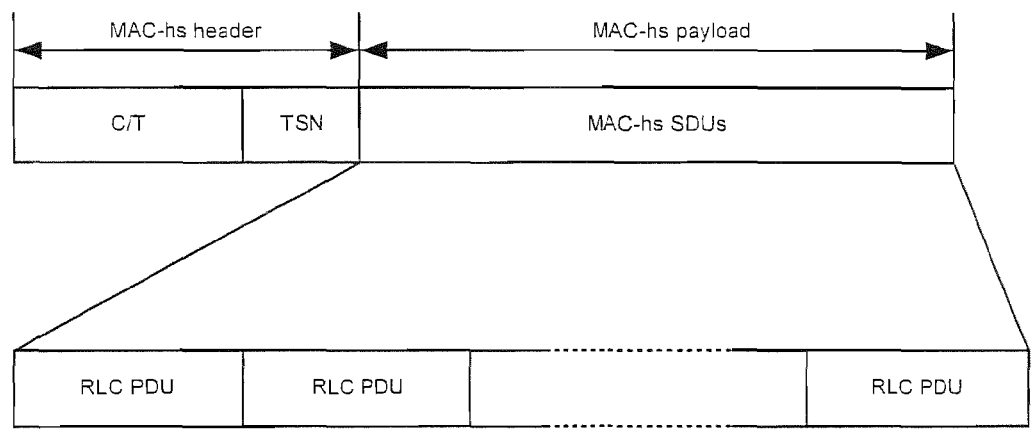
FIG. 12 is a drawing illustrating a Data Block format for HS-DSCH adopted in the data transmission method according to another preferred embodiment of the present invention.

FIG. 12 shows a Data Block format for HS-DSCH adopted in the data transmission method according to a second preferred embodiment of the present invention.

As shown in FIG. 12, the C/T field is included in the MAC-hs header not the MAC-d PDU headers (=MAC-hs payload) and the MAC-hs payload consists of RLC PDUs rather than MAC-d PDU. Since there is no logical channel multiplexing and the data to be transmitted through each Data Block are originated from the same logical channel, only one C/T field per Data Block is enough to distinguish the logical channel.

By constructing the Data Block format in this manner, the Data Block format can be much simpler than one of the first preferred embodiment.

As described above, in the data transmission method according to the present invention each Data Block is composed of the MAC-d PDUs originated from the same logical channel such that it is possible to monitor the in-sequence delivery of MAC-d PDUs, resulting in reduction of undesirable queuing delay caused by logical channel multiplexing.

Also, since the data transmission method of the present invention can reduce the possibility of discard of the data to be transmitted in UTRAN side by quickly delivering the data queued in reordering buffer to the higher layer and to acknowledges to the UTRAN, resulting in enhancement of the data transmission performance.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for processing data in a communication system, the method comprising:
   receiving a medium access control (MAC) protocol data unit (PDU) comprising a header and a payload from a transmitting device,
   wherein the payload includes a plurality of MAC service data units (SDUs) and the header includes an identifier used to map the plurality of MAC SDUs to a reordering buffer and a sequence number of the MAC PDU,
   wherein the identifier is common to the plurality of SDUs and the reordering buffer is configured according to the identifier;
   checking the identifier of the header of the received MAC PDU to identify the reordering buffer;
   storing the MAC PDU in the reordering buffer identified by the identifier;
   processing the stored MAC PDU for delivery to an upper layer.

2. The method of claim 1, further comprising disassembling the MAC PDU into the plurality of MAC SDUs; and
   delivering the disassembled MAC SDUs to the upper layer.

3. The method of claim 1, wherein the reordering buffer supports in-sequence delivery of data associated with the stored MAC PDU to the upper layer.

4. The method of claim 1, wherein the stored MAC PDU is delivered to the upper layer based on the sequence number.

5. A communication device for receiving data in a radio communication system, the communication device comprising:
   a receiving unit for receiving a medium access control (MAC) protocol data unit (PDU), wherein the MAC PDU includes a header and a payload, wherein the payload includes a plurality of MAC service data units (SDUs) and the header includes an identifier used to map the plurality of MAC SDUs to a reordering buffer and a sequence number of the MAC PDU;
   a reordering buffer for storing the received MAC PDU; and
   a processor for:
      checking the identifier of the header of the received MAC PDU to identify the reordering buffer,
      storing the MAC PDU in the reordering buffer identified by the identifier, and
      processing the stored MAC PDU for delivery to an upper layer,
   wherein the identifier is common to the plurality of SDUs and the reordering buffer is configured according to the identifier.

6. The communication device of claim 5, wherein the processor disassembles the MAC PDU into the plurality of MAC SDUs, and delivers the disassembled MAC SDUs to the upper layer.

7. The communication device of claim 5, wherein the reordering buffer supports in-sequence delivery of data associated with the stored MAC PDU to the upper layer.

8. The communication device of claim 5, wherein the stored MAC PDU is delivered to the upper layer based on the sequence number.

* * * * *